April 28, 1964    N. B. MEARS    3,130,487
METHOD OF MAKING FINE MESH DOME-SHAPED GRIDS
Filed Dec. 17, 1962

INVENTOR
NORMAN B. MEARS
BY *John E. Stryker*
ATTORNEY

3,130,487
METHOD OF MAKING FINE MESH DOME-SHAPED GRIDS
Norman B. Mears, Dakota County, Minn.
(1170 Dodd Road, St. Paul, Minn.)
Filed Dec. 17, 1962, Ser. No. 245,001
14 Claims. (Cl. 29—424)

This invention relates to a method of making fine mesh dome-shaped grids, and has for its principal object to provide a method of making such grids having from approximately 2000 to more than 1,000,000 apertures per square inch, of sizes affording from about 40% to 80% light transmission through the grid.

Heretofore flat grids of such fine mesh have been made by a method which includes the steps of electroplating a suitable metal on a matrix having non-conducting material defining the location and size of the apertures. The pattern of the apertures has been reproduced on a flat metal matrix by known photoprinting and developing procedure and the grids have been electroformed on the matrix by electroplating to the thickness of the non-conducting material and finally stripping the grid from the matrix. An example of such procedure is described in Norris Patent No. 2,166,367, dated July 18, 1939. In an effort to extend this general method to the production of dome-shaped grids, an electrical conductor material, such as a sheet of copper, has been shaped mechanically by spinning or die forming to the required dome shape, an image of the aperture pattern has been reproduced on the exterior of the dome-shaped conductor material, whereby the apertures are defined by non-conducting material, the areas defined by the bare areas have been etched to a predetermined depth, the etched areas have been electroplated to form the screen and the latter has been stripped from the matrix.

Even for the manufacture of relatively coarse dome-shaped screens, this method has the disadvantage of making it very difficult, if not impossible, to maintain aperture sizes due to the fact that the plating metal, in addition to adding thickness to the fine screen, spreads over the non-conducting material to partially and irregularly reduce the sizes of the apertures. Extensive tests have shown that it is impossible to maintain tolerances in the aperture sizes and lands where this electroplating method is attempted for screens of 50 to 1500 line mesh and with light transmission on the order of 40% to 80%.

According to the present invention, I am able to produce dome-shaped pieces of mesh having from 50 to 1500 lines per inch, and light transmission ranging from 40% to 80%, held within tolerances on the order of 1% to 2%. It will be evident that such mesh is so thin and fragile that it cannot be electroformed on a matrix, then stripped therefrom, and subsequently shaped as a dome having apertures of controlled size and shape. As the first step in my preferred method a metal blank sheet of suitable thickness is prepared for etching by conventional treatment. This blank may be formed from any suitable etachable metal or alloy of which nickel, stainless steel, molybdenum, tungsten and "Inconel" are examples. These metals and alloys, with the exception of nickel, cannot be electroformed, economically, by presently known electroforming techniques. The blank sheet, so prepared, may be made from any of these metals, preferably of a thickness within the range .0002 to .002. A thin coat of photo-resist material may then be applied to one or both sides of the blank metal sheet, followed by contact printing of the aperture design on the coating, developing to expose the surface areas defining the apertures, and etching treatment to obtain the fine mesh in thin sheet form. This sheet may then be placed in an electroplating bath adapted to encase the screen or mesh in a dissimilar metal. For example, copper may be used in the plating bath to encase a fine nickel screen. Electroplating is continued until the apertures in the screen are closed, thereby producing a bimetallic sheet of substantially increased thickness. If the nickel screen is .002 inch or less in thickness, for example, the electroplating may be continued until the bimetallic sheet is on the order of .003 to .004 inch thick, with the second metal filling all apertures.

In preparation for the subsequent dome shaping operation most metal screens require annealing. The temperature and duration of the heat treatment required to impart a suitable degree of ductility will, of course, vary according to the metals or alloys selected for the screen and encasing metal. For example, a find mesh nickel screen encased in copper may be annealed at approximately 1750° F. for from three to eight minutes, depending on the thickness and presence of alloys.

For screens made of the harder metals having relatively high melting points such as stainless steel, molybdenum or tungsten, the fine mesh is annealed at a temperature and for a time which is suitable for the particular metal prior to encasing the screen in the second metal. Subsequent to the encasing of the screen in the second metal, annealing treatment may be repeated at a temperature suitable for the second metal which may have a melting point which is lower than the annealing temperature of the fine mesh screen.

As the next step, the bimetallic, malleable sheet is given the required dome shape, either by the use of dies or known spinning procedure. A complete hemisphere or any lesser segment of dome shape may be thus formed as required. During this shaping operation, since the apertures are filled with the second metal, the sizes and shapes of the apertures, as determined by the original mesh pattern, are not materially affected. For best results suitable annealing treatment should be applied at least once during the dome-shaping operation. For this purpose the dome-shaping may be interrupted for the annealing and then resumed to complete the hemisphere shape.

Thereupon, the dome-shaped workpiece is treated to remove the second metal and obtain the predetermined fine, open mesh grid having apertures of sizes and shapes maintained within close tolerances. For the example in which a fine nickel mesh is encased in copper, chromic acid may be used as the etching agent to remove the copper, without damage to the nickel mesh.

As a modification of the procedure hereinbefore described, the flat, fine mesh screen formed from a first metal or alloy may be encased in a dissimilar material having a lower melting point. For example, metallic lead, or a lead alloy may be used as encasing material which may be removed by heat treatment after the dome shape has been imparted to the composite workpiece.

According to a further modification of my invention, the fine mesh metal screen may be formed by electro-deposition on a matrix formed from a second conducting material and including non-conducting material defining the apertures. For example, a fine mesh screen may be formed from nickel or other electro-formable metal or alloy on a thin copper matrix upon which the aperture pattern is defined by non-conducting photo-resist material. A fine mesh screen of the requred thickness is electroformed on this normally flat matrix, care being taken to insure that the nickel or other mesh material which is deposited on the developed areas of photo-resist has good adherence to the copper matrix. The photo-resist material may then be removed by submerging the work in a suitable caustic solution. The matrix having the nickel mesh adhered thereto may then be placed in a copper plating bath, and the otherwise exposed side of the nickel mesh over-plated to a thickness of a few thousandths of an inch, e.g., .004–.005 inch.

The resulting bimetallic sheet may then be annealed, and as the next step, may be die formed or spun to the required dome shape. Finally, the metal matrix and overplated layer of copper or other second metal is removed from the dome-shaped fine mesh grid by chemical treatment, using an agent which does not attack or materially affect the grid metal.

In the accompanying drawing a fine mesh screen in various stages of manufacture, according to my improved method, is illustrated schematically and on a greatly enlarged scale.

Referring to the drawing.

Figure 1:
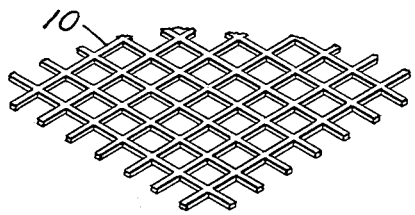
FIGURE 1 is a perspective view showing a fragmentary portion of a fine mesh screen in its initial stage, before imparting the dome shape.
Figure 2:
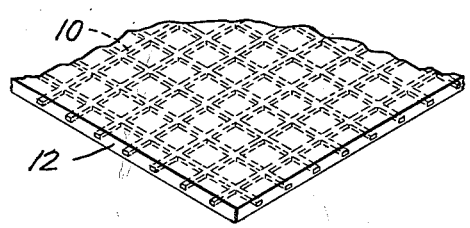
FIG. 2 shows the fragmentary portion of the screen of FIG. 1 encased in a dissimilar material which fills the apertures.

In the drawing, a fine mesh screen in its initial planar or flat shape is indicated at 10, and the same screen, after it has been given its dome shape, is indicated at 11. As hereinbefore described in detail, the screen 10 is encased in a dissimilar material indicated at 12 in FIGS. 2 and 3 so that the apertures in the screen are filled with a material having sufficient hardness to maintain the size and shape of the apertures after the initially flat, encased screen has been given its hemispherical or other dome shape illustrated in FIG. 3. As further hereinbefore described, the encasing material 12 is removed from the screen 11 by suitable treatment, such as heat treatment or etching or other chemical treatment, which does not deleteriously affect the mesh, to produce the open mesh dome-shaped screen shown schematically in FIG. 4.

Figure 3:
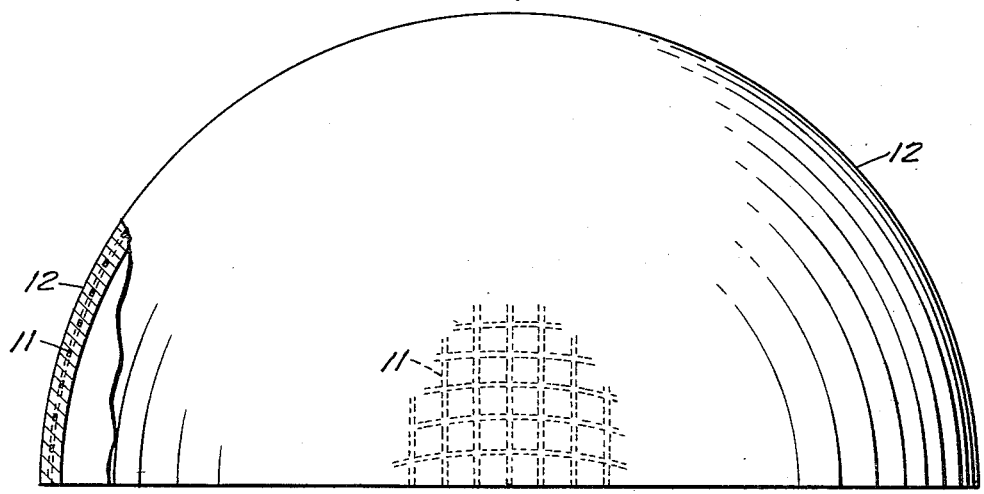
FIG. 3 is a part side elevational view and part vertical sectional view of the encased screen after it has been given its dome shape.
Figure 5:
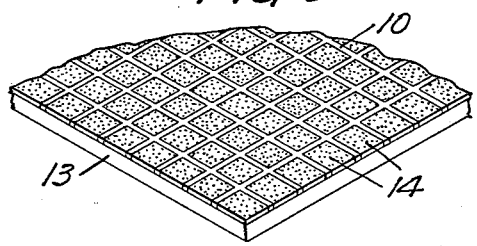
FIG. 5 shows a fragmentary portion of a screen in place on an initially flat matrix upon which it has been electroformed.

As indicated in FIG. 5, the screen 10 may be electroformed on a matrix comprising a sheet of copper or other second metal 13 having protruding members 14 of non-conducting material defining the screen apertures. The non-conducting members 14, for example, may be etching resist material, filling the apertures in the screen 10. As the next step in the modified method of producing a dome-shaped screen, the non-conducting members 14 are removed from the apertures of the screen 10 as hereinbefore described, preferably by chemical treatment. Annealing treatment of sheet 13 is usually required to impart the required malleability. Assuming that the matrix base plate 13 is copper, the subsequent procedure may include the overplating of the screen 10 with copper to produce a bimetallic sheet, such as that shown in FIG. 2, followed by the drawing of the encased screen 10 into a dome shape, as indicated in FIG. 3, to produce the dome-shaped screen 11. For the final treatment to remove the copper encasing material 12, without affecting a nickel screen 11, the workpiece may be immersed in chromic acid.

Figure 4:
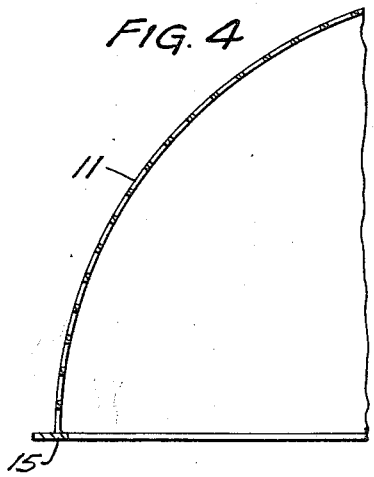
FIG. 4 shows a fragmentary portion of a finished dome-shaped screen.
Figure 6:
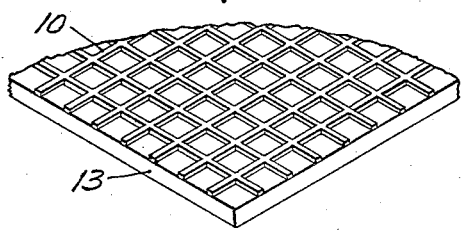
FIG. 6 shows the screen and matrix of FIG. 5 after removal of the non-conducting material from the screen apertures.

As further indicated in FIG. 4, a mounting ring 15 of metal may be secured, by soldering or heat fusion, to the open periphery of the dome-shaped grid 11. This ring binds off the ends of the grid filaments and maintains the circular shape of the dome base.

Annealing treatment, as hereinbefore described, is essential if the starting materials, viz., either the screen or matrix sheets are cold worked sheets of any of the annealable metals herein named.

It will be evident that my improved method secures a number of beneficial results including, elimination of the need for stripping extremely fragile mesh from a matrix on which it has been electroformed, eliminating the difficulties attendant upon electroforming fine mesh grids on dome-shaped matrices, improving the control of aperture sizes of minute sizes by avoiding the irregular extension of electroformed grid metal over the tops of the non-conducting material defining the sizes and shapes of the apertures on a matrix, and preventing substantial distortion of the shapes and changes in the aperture sizes heretofore attendant upon imparting a dome shape to an initially flat fine mesh screen.

I claim:
1. A method of making a fine mesh dome-shaped grid which comprises:
   (a) forming in a first annealable metal or alloy a fine mesh screen having a multiplicity of apertures of predetermined size or sizes;
   (b) encasing said screen and filling said apertures therein with a dissimilar malleable second metal to form a bimetallic sheet;
   (c) annealing said fine mesh screen;
   (d) imparting to said bimetallic sheet a predetermined dome shape, and
   (e) treating said dome shaped bimetallic sheet to remove the encasing second metal from the remaining fine open mesh grid of dome shape.

2. A method in accordance with claim 1 in which step (a) is performed on a thin cold-worked sheet of annealable metal.

3. A method of making a fine mesh dome-shaped grid in accordance with claim 1 in which the encasing second metal has a melting point substantially higher than the annealing temperature of said first metal.

4. A method of making a fine mesh dome-shaped grid in accordance with claim 3 including the step of interrupting step (d) before the completion of the dome shaping, and heating the partially domed bimetallic sheet to an annealing temperature which is lower than the melting temperature of the encasing metal, and then completing the dome forming treatment.

5. A method in accordance with claim 1 in which step (e) consists in heat treating said bimetallic dome-shaped sheet at a temperature which is lower than the melting point for said dome-shaped grid and higher than the melting point of said second metal to remove the encasing metal from the remaining fine open mesh grid of dome shape.

6. A method of making a fine mesh dome-shaped grid in accordance with claim 1 in which the apertures formed in said first metal or alloy are formed in a thin metal blank by photoprinting and etching treatment.

7. A method of making a fine mesh dome-shaped grid in accordance with claim 1 in which in excess of 500 apertures per square inch and of such size or sizes as to afford light transmission through the screen within the range 40%–80% are formed in said first metal.

8. A method of making a fine mesh dome-shaped grid in accordance with claim 1 in which the encasing of said screen consists in electroplating said second metal on said screen and continuing the electroplating until the apertures are completely closed.

9. A method of making a fine mesh dome-shaped grid in accordance with claim 8 in which the treating of said encased dome-shaped screen to remove the second metal consists in applying thereto an etching agent which is reactive to said second metal and non-reactive to said first metal.

10. A method of making a fine mesh dome-shaped grid in accordance with claim 1 in which step (a) consists in electroforming said fine mesh screen on a matrix comprising, a thin sheet of a second metal on which a dot pattern of non-conducting material defines the apertures in said screen, and from which said dot pattern of non-conducting material is removed preparatory to step (b).

11. A method of making a fine mesh dome-shaped grid in accordance with claim 1 in which said first metal is nickel and said second metal is copper.

12. A method of making a fine mesh dome-shaped grid which comprises:
   (a) providing a thin matrix of malleable metal having adhered thereto a multiplicity of minute etching resist members of sizes and shapes corresponding to the sizes and shapes of the apertures to be formed in a fine mesh screen;
   (b) electroforming on said matrix a fine mesh screen consisting of a metal having different etching characteristics from that of said matrix;
   (c) removing said etching resist members from said matrix;
   (d) overplating said screen with a second metal having an etching characteristic differing from that of said first metal and similar to that of said matrix metal, whereby said apertures are filled with said second metal;
   (e) imparting to said overplated screen a predetermined dome shape, and
   (f) chemically removing said second metal and the metal of said matrix by applying to the same an agent which is reactive thereto and non-reactive to the metal of said screen.

13. A method of making a fine mesh dome-shaped grid which comprises:
   (a) forming in a thin sheet consisting of a first malleable metal a multiplicity of apertures;
   (b) electroplating the screen so formed with a dissimilar malleable second metal and continuing the electroplating until said apertures are filled with the second metal;
   (c) imparting to said electroplated screen the required dome shape, and
   (d) treating said bimetallic electroplated dome-shaped screen to remove said second metal therefrom.

14. A method in accordance with claim 13 in which step (d) consists in chemically removing said second metal by applying to the dome-shaped bimetallic screen an agent which is reactive to said second metal and non-reactive to said first metal.

References Cited in the file of this patent
UNITED STATES PATENTS

| | | |
|---|---|---|
| 1,060,361 | Rea | Apr. 29, 1913 |
| 1,604,216 | Brainin | Oct. 26, 1926 |
| 2,083,865 | Rensink | June 15, 1937 |
| 2,225,794 | Ota | Dec. 24, 1940 |